United States Patent
Rieschl et al.

(10) Patent No.: US 7,188,062 B1
(45) Date of Patent: Mar. 6, 2007

(54) CONFIGURATION MANAGEMENT FOR AN EMULATOR OPERATING SYSTEM

(75) Inventors: Michael J. Rieschl, Cottage Grove, MN (US); Mitch M. Maurer, Brooklyn Park, MN (US); Steven R. Bernardy, Roseville, MN (US); Patrick W. Cummings, Ramsey, MN (US); Anne M. Steiner, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 590 days.

(21) Appl. No.: 10/330,983

(22) Filed: Dec. 27, 2002

(51) Int. Cl.
*G06F 9/455* (2006.01)

(52) U.S. Cl. .................. 703/23; 709/321; 717/138; 710/36; 703/25; 703/27

(58) Field of Classification Search .............. 703/23, 703/27, 25; 709/321, 246, 319; 713/200; 717/138, 168, 101; 345/746; 711/6, 156; 712/220; 710/36
See application file for complete search history.

(56) References Cited

U.S. PATENT DOCUMENTS

| | | | |
|---|---|---|---|
| 5,574,914 A * | 11/1996 | Hancock et al. ............ 712/220 |
| 6,321,279 B1 * | 11/2001 | Bonola .................... 710/36 |
| 6,763,328 B1 * | 7/2004 | Egolf et al. ............... 703/27 |
| 6,961,806 B1 * | 11/2005 | Agesen et al. ............ 711/6 |
| 2002/0147969 A1 * | 10/2002 | Lethin et al. ............. 717/138 |
| 2002/0191018 A1 * | 12/2002 | Broussard ................ 345/746 |
| 2002/0194496 A1 * | 12/2002 | Griffin et al. ............. 713/200 |
| 2003/0037178 A1 * | 2/2003 | Vessey et al. ............ 709/319 |
| 2003/0056067 A1 * | 3/2003 | Lawrence ................ 711/156 |
| 2003/0097247 A1 * | 5/2003 | Bond et al. ............... 703/23 |
| 2003/0130833 A1 * | 7/2003 | Brownell et al. ........... 703/23 |
| 2003/0131148 A1 * | 7/2003 | Kelley et al. ............. 709/321 |
| 2003/0135662 A1 * | 7/2003 | Pett et al. ................ 709/321 |
| 2003/0140171 A1 * | 7/2003 | Hahn ..................... 709/246 |
| 2003/0182099 A1 * | 9/2003 | Mocek et al. ............. 703/23 |
| 2003/0212902 A1 * | 11/2003 | van der Made ........... 713/200 |
| 2003/0225929 A1 * | 12/2003 | Adams ................... 709/321 |
| 2004/0003371 A1 * | 1/2004 | Coulthard et al. ......... 717/101 |
| 2004/0088692 A1 * | 5/2004 | Sutton et al. ............. 717/168 |
| 2004/0111250 A1 * | 6/2004 | Hensley ................... 703/25 |

OTHER PUBLICATIONS

Horling et al., "Distributed sensor network for real time tracking", ACM 2001.*
Govil et al. Cellular disco: Resource management using virtual clusters on shared memory processors, ACM 2000.*

* cited by examiner

*Primary Examiner*—Paul Rodriguez
*Assistant Examiner*—Kandasamy Thangavelu
(74) *Attorney, Agent, or Firm*—Charles A. Johnson; Mark T. Starr; Hollingsworth & Funk, LLC

(57) ABSTRACT

A method and apparatus for managing the configuration of a computing arrangement having a host operating system and an emulator operating system includes establishing host operating system interfaces to computing arrangement components. The computing arrangement is scanned, using the host operating system interfaces, to determine configuration information about computing arrangement components reserved for use by the emulator operating system. At least a portion of the scanned configuration information is communicated to the emulator operating system.

28 Claims, 4 Drawing Sheets

CONFIGURATION MANAGEMENT FOR AN EMULATOR OPERATING SYSTEM

FIELD OF THE INVENTION

The present invention relates to digital data processing systems, and more specifically to configuration management for an emulator operating system.

BACKGROUND OF THE INVENTION

A computing arrangement (e.g., computer system) includes hardware and software components. Conventionally, a computing arrangement includes an instruction processor and a memory arrangement for storing instructions, and for optionally storing data. The instruction processor fetches instructions from the memory and executes the instructions. A set of instructions comprises the software component, or computer program. One fundamental piece of software executed on the instruction processor is called an operating system.

The operating system is the software most closely associated with the computer hardware. The operating system typically manages the real and simulated hardware components comprising the computing arrangement. The operating system contains software interfaces that facilitate the communication of other software components with the physical and simulated (i.e., logical) hardware components of the computing arrangement. An operating system hides the communication with the hardware components by using a file structure. Other software components operate "on top of" the operating system, making use of the features and interfaces the operating system provides. The other software components assign, free, read and write to the various hardware components indirectly via files managed by the operating system. The other software components actually manipulate the files, and the operating system handles the I/O associated with the manipulated files, managing the interfaces between the files and actual (or simulated) hardware component(s). Therefore, the operating system needs to know certain information regarding the configuration of the physical and simulated (i.e., logical) hardware components such as their existence, location (i.e., connectivity) and allocation so that the operating system can effectively manage the computing arrangement.

Physical hardware components include, for example, input/output processors (IOP), channels (e.g., Small Computer Systems Interface (SCSI) HBA cards), control units, connections, physical memory, and various devices such as tapes, disk drives, etc. An IOP is a piece of software associated with a hardware bridge used to fetch input/output (I/O) instructions and data from a memory arrangement, and communicated with a channel, control unit, or device. Simulated hardware components include, for example, emulated instruction processors (software), consoles (software), logical drives and emulated memory allocations.

A modern computer system may be arranged to include more than one operating system. Where a computing arrangement includes more than one operating system, the underlying, or primary, operating system is referred to as the host operating system. An emulator is a piece of software that executes on the host operating system to mimic another computing arrangement configuration. Another operating system executes on the emulator (i.e., the emulated machine, or emulated computing system), and is referred to herein as the "emulator operating system" to differentiate this additional operating system from the host operating system. The emulator operating system is not itself emulated, but simply connotes an operating system that executes on the emulated machine. Both the host and emulator operating systems need to be aware of the existence of the configuration of the physical and simulated hardware components comprising the computing arrangements they control. The host operating system knows of the existence of all hardware, but typically certain hardware components are reserved for use by the emulator operating system. Certain devices reserved for the emulated machine may not even be formatted for the host operating system.

One conventional method for making the hardware components and connectivity known to an emulator operating system was to manually insert the computing system configuration using a piece of software called System Configuration Management System (SCMS). For example, certain information regarding a respective hardware component was entered as data via a human interface device or otherwise downloaded from an external source. After the hardware component and its connectivity information are inserted, SCMS creates a Partition Data Bank (PDB) file. Subsequently, the PDB file is fed into the emulator operating system's boot process. Thereby, the PDB file provides the emulator operating system a "blue print" of the I/O system configuration.

A method and apparatus that improves upon the aforementioned configuration management techniques for emulator operating systems, as well as addresses other related efficiencies, are therefore desirable.

SUMMARY OF THE INVENTION

In various embodiments, the invention provides a method and apparatus for communicating configuration management information to an emulator operating system.

According to a general exemplary embodiment of the present invention, a method for managing the configuration of a computing arrangement having a host operating system and an emulator operating system includes establishing host operating system interfaces to computing arrangement components. The computing arrangement is scanned, using the host operating system interfaces, to determine configuration information about computing arrangement components reserved for use by the emulator operating system. At least a portion of the scanned configuration information is communicated to the emulator operating system.

According to one exemplary embodiment of the present invention, a method of managing the configuration of a computing arrangement having a host operating system includes executing an emulator on the host operating system and executing an emulator operating system on the emulator. The computing arrangement is scanned using host operating system interfaces and at least one computing arrangement component reserved for an emulator computing system, and the configuration thereof, is identified in response to the scanning. A data structure representative of the configuration is compiled in response to the identifying and the configuration is communicated to the emulator operating system.

According to one exemplary embodiment of the present invention, a computing arrangement having a host operating system includes an emulator executing on the host operating system, and an emulator operating system executing on the emulator. The host operating system has interfaces adapted to scan the computing arrangement. A software component is adapted to identify at least one computing arrangement component reserved for an emulated computing system and the configuration thereof in response to scanning. Another application is adapted to compile a data structure representative of the configuration in response to identifying, and a file is arranged to communicate the configuration to the emulator operating system.

The above summary of the present invention is not intended to describe each disclosed embodiment of the present invention. The figures and detailed description that follow provide additional exemplary embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

Figure 1:
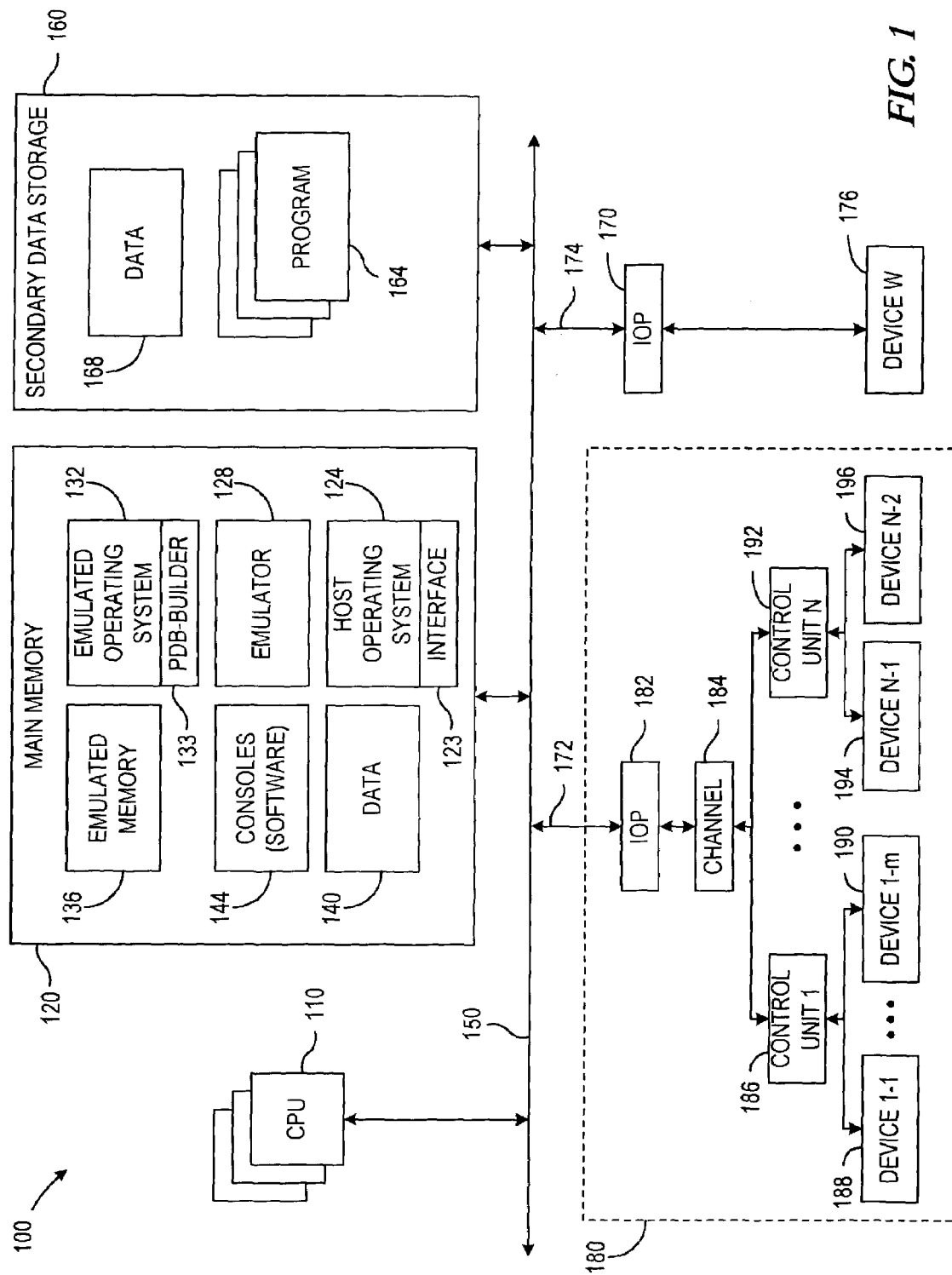
FIG. 1 is a block diagram that illustrates a computing arrangement, according to an exemplary embodiment of the present invention.

In various embodiments, the invention provides a method and system for dynamically communication configuration of an emulated computing system by utilizing a host operating system's interfaces to determine the configuration of components reserved for use by the emulated computing system. The approach of the present invention is substantially automated in comparison to conventional emulated computing system configuration methods.

According to a general embodiment of the method of the present invention, the configuration of a computing arrangement having a host operating system and an emulator operating system includes establishing host operating system interfaces to computing arrangement components. The computing arrangement is scanned to determine configuration information about computing arrangement components reserved for use by the emulator operating system using the host operating system interfaces, and at least a portion of the scanned configuration information is communicated to the emulator operating system.

According to another general embodiment of the method of the present invention, a computing arrangement has a host operating system, an emulator operating on the host operating system, and an emulator operating system executing on the emulator. The computing arrangement is scanned using interfaces of the host operating system. At least one computing arrangement component, reserved for the emulator operating system, and the configuration thereof, is identified in response to the scanning. A data structure representative of the configuration is compiled in response to the identifying, and the configuration is communicated to the emulator operating system.

In the past, significant quantities of mainframe computing systems were operationally implemented along with their associated supporting software applications. Typically, the mainframe computing systems were implemented using hardware and processing capabilities available at the time of implementation. However, the speed of data processing equipment has continued to increase over time. Over time, the magnitudes of operating speed improvement realized is often measured in multiples of prior operating speed, rather than as an incremental increase (e.g., according to Moore's "law"). Today, operating speeds of commodity computers often significantly exceed operating speeds of prior mainframe computing arrangements. Commodity computers are those sold in great volumes to retail customers (e.g., personal computers), or sold in significant volumes to business consumers (e.g., mini-computers, servers, etc.). The operating speeds of the commodity computers of today are sufficient to realize operating speed increases of an mainframe emulator operating system executing over a host operating system executing on a commodity computer versus the a similar mainframe operating system executing directly as part of a stand-alone mainframe computing arrangement.

Significant time, effort and cost have been invested into developing software applications for past stand-alone mainframe computing systems, and debugging and/or customizing particular applications. Users of these old mainframe systems have developed significant confidence and reliance in these existing mainframe systems; however, performance (e.g., speed) relative to newer hardware continues to erode. Therefore, it is desirable in many regards to migrate existing software applications to new, faster, hardware platforms, rather than develop replacement applications to accompany the new, faster, hardware platforms.

Accordingly, one particular implementation of the computing arrangement 100 of the present invention is a "mainframe computing system" comprising a commodity computer having a host operating system and a mainframe emulator computing system executing "on top of" the host operating system. According to one exemplary embodiment, use of the commodity computer is dedicated solely (or primary) to serve as the platform for emulation of the mainframe computing system. In this way, the old software applications developed for past mainframe computers can benefit from increased operational speeds of more recent commodity computers serving as a dedicated platform for a mainframe emulator computing system. Significant time, cost and attention can be saved by emulation of the mainframe operating system, rather than adaptation of significant quantities of old software application code to new hardware.

FIG. 1 illustrates a computing arrangement 100, according to an exemplary embodiment of the present invention. According to an exemplary embodiment of the present invention, computing arrangement 100 is a commodity computer. Computing arrangement 100 includes at least one CPU 110, main memory 120, secondary data storage 160 and components reserved for an emulated computing system 180 all communicatively coupled to a bus 150. Computing arrangement 100 includes a host operating system 124 and an emulated mainframe computing system executing on top of the host operating system. According to one exemplary embodiment of the present invention, CPU 110 is an Intel microprocessor and host operating system 124 is a Microsoft operating system (e.g., one of the various versions of Windows). Host operating system 124 (software) is stored in main memory 120, along with an emulated instruction processor 128 (an emulator) and the associated emulator operating system 132. Main memory 120 may also include portions allocated to emulated memory 136, data 140, consoles 144 (software), and optionally, other simulated (i.e., logical) "devices." Additional data 168 and other programs 164 can be stored in one or more optional secondary data storage arrangements 160 such as physical drives, removable media or other arrangements of remote digital information storage. The computing system may also include one or more IOP 170 communicatively coupled to bus 150 through an interface 174. Further, device(s) 176 are communicatively coupled to IOP 170 and are formatted for use by the host operating system. For example, where the host operating system is a Windows type operating system, device(s) 176 such as printers, storage media, communication portals, connections, or other conventionally known computing arrangement peripherals are formatted for direct use by the host Windows operating system.

The emulated mainframe computing system includes emulator 128 (software) executing on the host operating system, the emulator operating system 132 executing on emulator 128, and a portion of computing arrangement 100's hardware components reserve for the emulated mainframe computing system. Hardware components reserved for use by the emulated computing system 180 comprises physical, as well as simulated hardware components of computing arrangement 100. In order to function efficiently, host operating system 124 must obtain configuration information about the computing arrangement 100 including hardware (physical and simulated) components comprising the emulated computing system and communicatively coupled to computing arrangement 100 through interfaces such as interface 172, as well as other physical hardware components communicatively coupled to computing arrangement 100 through interfaces such as interface 174, and other components simulated or emulated in software.

Host operating system 124 obtains configuration information about computing arrangement 100 through a software interface 123. According to one exemplary embodiment of the present invention, software interface 123 is integral to host operating system 124. According to other embodiments, software interface 123 is at least in part comprised of software components distinct from host operating system 124. Through software interface 123, host operating system has an ability to scan computing arrangement 100 to obtain configuration information through interfaces 172 and 174 for hardware components, including the portions of computing arrangement 100 reserved for the emulated computing system.

The particular configuration of components reserved for the emulated computing system 180 is shown for illustrative purposes only. Other embodiments of the present invention may contain computing arrangement configurations having more or fewer components and connections, arranged similarly or differently than that shown in FIG. 1. Components reserved for the emulated computing system 180, as illustrated in FIG. 1, comprise an IOP 182 communicatively coupled to bus 150 via interface 172. A channel 184, such as a SCSI HBA card, is communicatively coupled to IOP 182, and at least one control unit is communicatively coupled to channel 184. FIG. 1 illustrates "N" control units being communicatively coupled to channel 184, with the first control unit 186 and $N^{th}$ control unit 192 being explicitly shown. Each of the N control units has at least one device communicatively coupled to it, such as a tape or disk drive, for example. By way of an example, two devices, 194 and 196, are explicitly shown in FIG. 1 communicatively coupled to the $N^{th}$ control unit 192, and "M" devices are shown communicatively coupled to control unit 186, including a first device 188 (designated device 1-1 as the first device of the first control unit) and an $M^{th}$ device 190 (designated device 1-M as the $M^{th}$ device of the first control unit).

According to a more particular exemplary embodiment of the present invention, computing arrangement 100 is a Unisys Magellan system having at least two (2) operating systems, including a host system and an emulated mainframe computing system (i.e., emulator). The emulator is an emulated instruction processor (i.e., software) that executes on a commodity computing arrangement, and executes "on top of" a host operating system such as Windows. The emulator is for example, a software implementation of a 2200 instruction processor that emulates a Unisys mainframe instruction set. A Unisys 2200 operating system (OS 2200) operates on the mainframe emulator as a mainframe emulator operating system. The emulated mainframe computing system also includes an emulate memory and one or more IOP processors implemented in software. The OS 2200 mainframe emulator operating system executes on the emulated instruction processor and communicates with the emulated memory and IOPs.

Certain hardware components and connections of the Magellan computing arrangement are reserved for the use of the emulated mainframe computing system. The host Windows operating system establishes interfaces (software) for components of the computing arrangement and therefore has information regarding the entire hardware system. However, the Windows operating system does not use the hardware components reserved for the operating system of the emulated mainframe computing system. Indeed, some of the hardware components are not formatted for use by the host Windows operating system.

Figure 2:
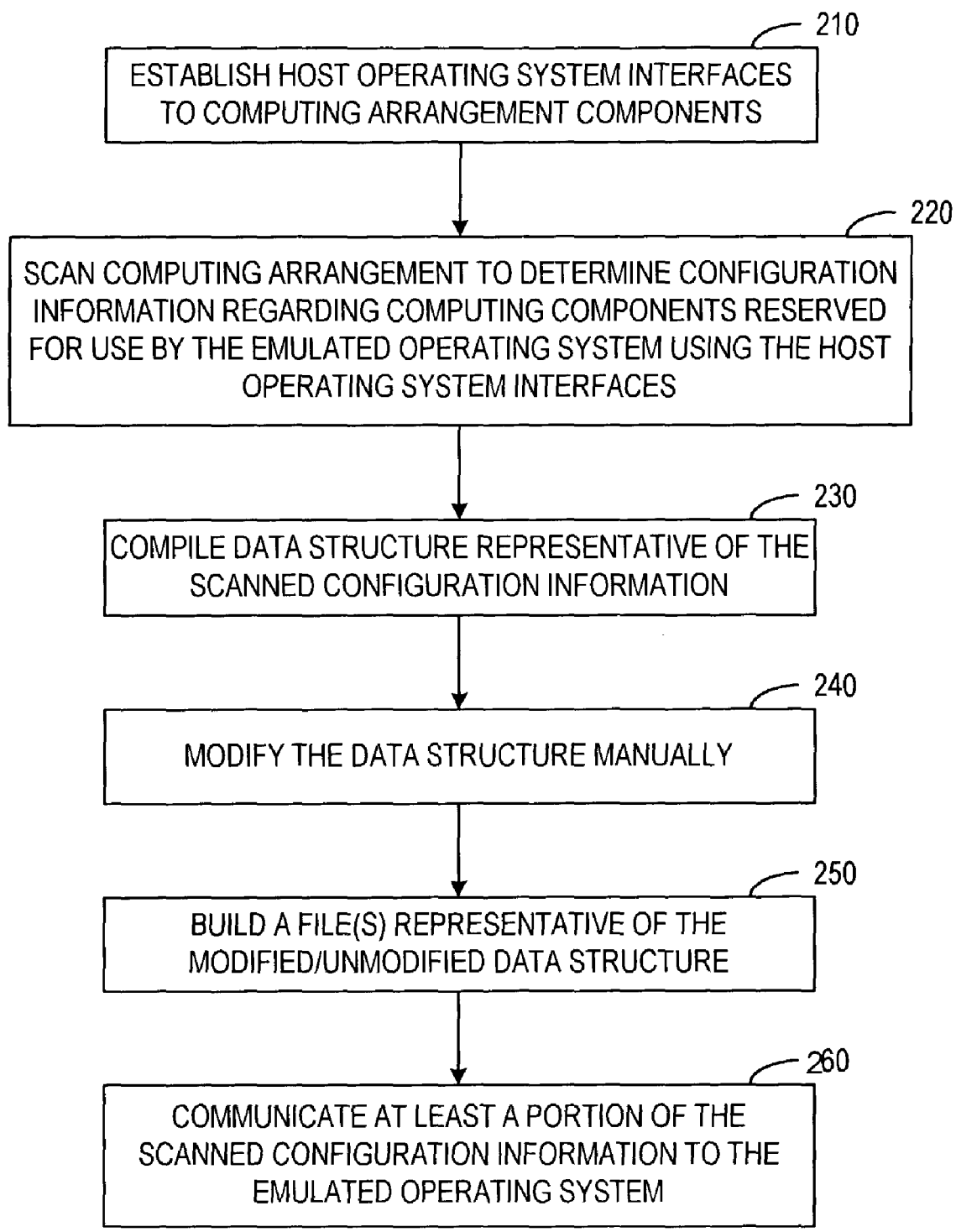
FIG. 2 is a flowchart of a process for managing configuration information of a computing arrangement having an emulator operating system, according to an exemplary embodiment of the present invention.

FIG. 2 illustrates a configuration management method for configuration of a computing arrangement having a host operating system and an emulator operating system, according to an exemplary embodiment of the present invention. According to a particular exemplary implementation, the computing arrangement is a commodity computer and the emulator operating system emulates, for example, a mainframe computer, such as a Unisys mainframe computer. The configuration management method includes establishing host operating system interfaces to computing arrangement components (step 210). Establishing interfaces includes establishing hardware and/or software interfaces to the resources and components comprising the computing arrangement. Once interfaces are established, the host operating system scans (step 220) the computing arrangement as part of its boot process to determine configuration information about computing arrangement, including components reserved for use by the emulator operating system.

Just as host operating system 124 requires configuration information for computing arrangement so that host operating system can manage the configuration, so too must the emulator operating system obtain configuration information about the emulator computing system the emulator operating system is managing. However, the emulator operating system is "managing" its computing resources "on top of" host operating system's management the computing arrangement.

The computing arrangement of the present invention includes a software interface PDB-BUILDER 133 which is adapted to build a Partition Data Bank (PDB) file. The PDB file is a peripheral (e.g., disks, tapes, other physical and simulated computing arrangement components reserved for use by the emulated mainframe computing system) configuration file. PDB-BUILDER 133 uses existing calls via well-defined interfaces established by the host operating system upon which the operating system of the emulated mainframe computing system is executing to scan the computing arrangement for physical hardware components and connections. In this manner, PDB-BUILDER 133 identifies components reserved for the emulated mainframe computing system's use, and the arrangement of the identified components.

The PDB-BUILDER software interface includes three (3) sub-components. A scan sub-component that uses the host (e.g., Windows) operating system interfaces to search the computing arrangement hardware components and connections for those components and connections reserved for the emulated mainframe computing system. As described earlier, the host (e.g., Windows) operating system includes routines as part of its boot process to dynamically scan the computing arrangement and establish interfaces with each computing arrangement component. Thereafter, the scan sub-component compiles and arranges a data structure responsive to the scanning and representative of the scanned emulated computing system configuration information (step 230). The scanned configuration information includes information for physical hardware components (e.g., peripheral tapes and disks).

Creation of the (intermediate) data structure containing configuration information associated with the emulated mainframe computing system is generated automatically, without user intervention. According to one implementation of the method of the present invention, creation of the PDB file from the data structure may also be accomplished in a completely automated fashion, e.g., without user supervision or input. Conventionally, configuration information for a mainframe class computing system was generated manually through user input of the specification and arrangement of each component. However, the present invention takes advantage of the capabilities of the operating system(s) underlying the operating system of the emulated mainframe computing system to automate the emulated mainframe computing system configuration acquisition and management process.

According to one implementation, the data structure is reviewed and modified manually as necessary or desired, before the PDB file representative of the modified (or unmodified) data structure configuration information is built. Once configuration information obtained by scanning is compiled into the data structure, a user interface sub-component of PDB-BUILDER (e.g., a window display described further below) displays the configuration information of the data structure. In addition, the user interface sub-component facilitates manual user modification of the data structure configuration information (step 240), including specification of emulated components (e.g., instruction processors, I/O/processors, etc.), and selection of whether to include or exclude an particular computing arrangement component in the emulated computing system (i.e., reserve the component for use by the operating system of the emulated mainframe computing system).

Finally, a package sub-component of the PDB-BUILDER software interface creates the PDB file from the data structure (step 250), for example after a user is satisfied with the configuration of the emulated computing system as detailed via the displayed data structure information. Emulated components in the PDB file are created on the emulated mainframe computing system as respective objects, an object being a piece of software that emulates that component. Therefore, there can be more than one instance of instruction processor and I/O processor objects.

Subsequently, the PDB file is communicated to the operating system of the emulated mainframe computing system (step 260) for use during the boot process of the operating system for the emulated mainframe computing system.

According to one aspect of the present invention, at least a portion of the scanned configuration information is communicated to the operating system of the emulated mainframe computing system.

Figure 3:
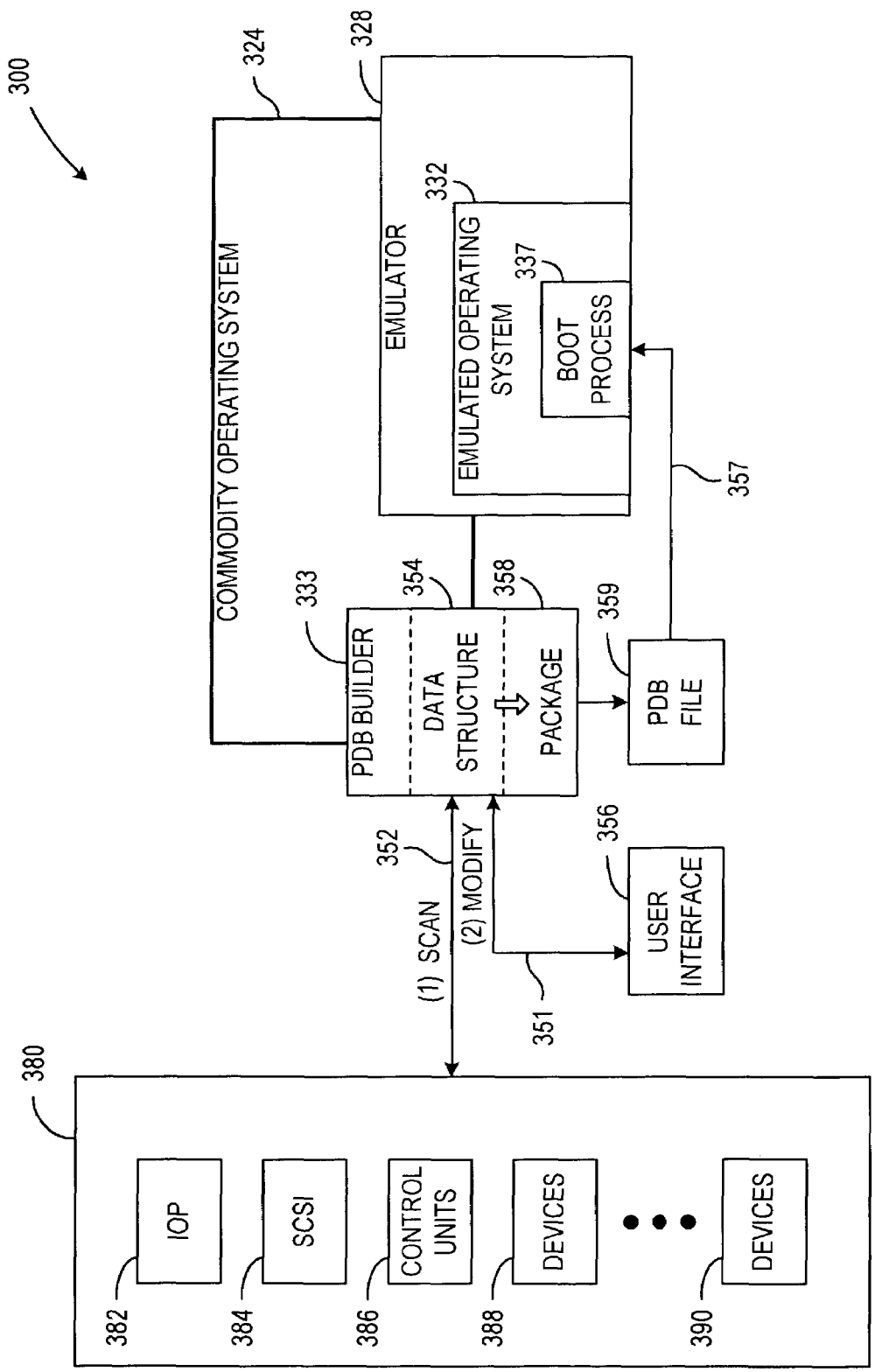
FIG. 3 is a block diagram that illustrates PDB Builder interfaces within the computing arrangement, according to an exemplary embodiment of the present invention.

FIG. 3 is a block diagram that illustrates PDB Builder interfaces within a computing arrangement 300, according to an exemplary embodiment of the present invention. Computing arrangement 300 is similar to computing arrangement 100 illustrated in FIG. 1; however, some details are omitted for clarity in illustrating computing system 300. Computing system 300 includes a commodity (i.e., host) operating system 324, under which an emulator 328 executes. An emulator operating system 332 executes on emulator 328. Emulator operating system 332 includes a boot process component 337 which requires information about components reserved for the emulated computing system 380, such as IOPs 382, SCSI channels 384, control units 386, and other devices 388–390.

PDB Builder 333 operates under commodity operating system 324. As described in detail above with reference to FIG. 2, PDB Builder 333 scans (as indicated by arrow 352) components reserved for the emulated computing system 380 to determine configuration information, and compiles a data structure 354 representative of the scanned information. Thereafter, data structure 354 may be modified manually via PBD Builder through a user interface 356 as indicated by arrow 351. Either automatically, or after a user command, a package component 358 builds the PDB file 359 representative of the data structure 354. PDB file 359 is fed into boot process 337 in order to communicate at least a portion of the scanned configuration information to the emulator operating system 332 (a portion of the scanned configuration information may have been manually edited out of data structure 354 by the user). The configuration information included in PDB file 359 is used by the boot process to initialize execution of emulator operating system 332.

Figure 4:
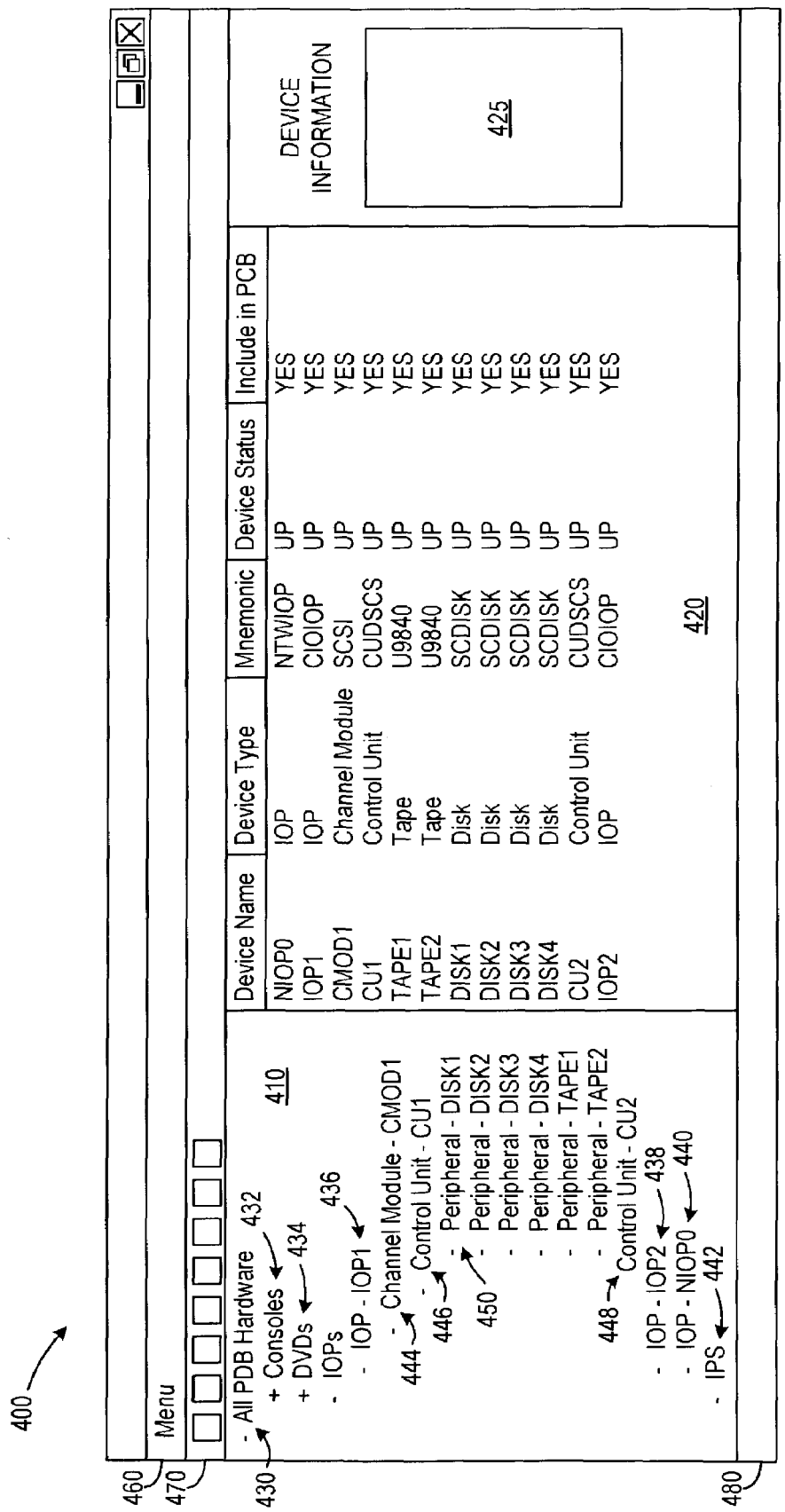
FIG. 4 is an illustration of a graphical user interface to a data structure, according to an exemplary embodiment of the present invention.

FIG. 4 illustrates one exemplary implementation of a display window 400 for the graphical user interface sub-component of the PDB-BUILDER software application of the present invention. Window 400 is split into two (2) portions, an organizational portion 410 and a detail portion 420. According to the particular implementation illustrated, organizational portion 410 utilizes a graphical tree view. Major components and subordinate components are visually arranged representing the logical arrangement, or configuration, of the components within the emulated computing system as determined after the scan of the computing arrangement is complete. Other presentations of the logical arrangement are contemplated by the present invention as suited for a particular implementation to efficiently convey to a user the configuration information. The displayed logical arrangement represents the configuration of components comprising the emulated computing system before a PDB file is built therefrom. The illustrated configuration represents the connectivity of the respective hardware (physical and simulated) components. As can be seen in organizational portion 410, arranged beneath "All PDB Hardware" 430 in the tree of components, are consoles 432, digital video disks (DVDs) 434, IOPs 436, 438 and 440, and instruction processor (IP) 442. Arranged subordinately to IOP 436 is a channel module 444, arranged subordinately to channel module 444 are control units 446 and 448, and arranged subordinately to control unit 446 are a plurality of peripherals (e.g., DISK1 450).

Detail portion 420 presents a listing of hardware components, and associated information of the respective components, associated with a "branch of the tree" selected graphically in organizational portion 410. Detailed information of hardware components may include device name, device type, mnemonic, device status and an indication as to whether the device is to be included in the subsequent creation of the PDB file. Additional, or alternative, component information may be displayed for a particular implementation of detail portion of the present invention to facilitate management of the configuration of the emulated computing system according to user preferences. A device information sub-window 425 is also shown to provide the same or additional information concerning a selected component not required in the detail window. For example, bus address and bus address range may be displayed for an individual component via device information sub-window 425.

In addition to the displayed information specific to a particular computing arrangement in organizational 410 and detail 420 portions respectively, conventional Windows type menu bar 460, tool bar 470 and status bar 480 are included as part of display window 400, of course customized to provide relevant information for the PDB creation application.

Through the displayed information and graphical control interfaces, such as a pointing device (e.g., mouse, trackball, touch pad, joystick, etc.) and/or a data entry device (e.g., keyboard, buttons, touch screens, etc.), a user may modify the configuration of the emulated computing system and/or the state of any particular hardware component by accessing and manipulating by conventional means, the data associated with a selected displayed component. Once a user approves of the displayed emulated computing system configuration with or without modification, or upon some other pre-selected criteria, the data structure is used to build a corresponding PDB file. According to one implementation, the user executes a PDB file creation function by activating the PDB button or function (not shown, but accessible through a menu or toolbar of window display 400). Alternatively, creation of the PDB file may also be automated to occur without any user intervention, or to occur unless some user intervention interrupts its creation.

Once launched, the PDB file creation function builds a Partition Data Bank (PDB) file from the final, modified or unmodified, configuration information contained within the data structure as illustrated by display window 400. The PDB file of computing system configuration information is thereafter fed, or read, into the boot process of the operating system for the emulated mainframe computing system to provide configuration information of components and connections reserved for use by the operating system of the emulated mainframe computing system. In this manner the configuration of IOPs, SCSI channels, control units, and devices, among others, are made known to the operating system of the emulated mainframe computing system for subsequent use and management. Just as the host operating system interfaces between other software and the actual devices, so does the operating system of the emulated mainframe computing system interface between the computing system components reserved for the emulated mainframe computing system and other mainframe software programs. Of course, the emulated mainframe computing system is executing "on top of" the host operating system, so the emulated mainframe computing system manages components of the emulated mainframe computing system indirectly through the host operating system.

Accordingly, the present invention provides, among other aspects, a method and apparatus for managing a computing arrangement configuration on an emulated computing system. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of configuration management for a computing arrangement having a host operating system and an emulator operating system, comprising:

establishing host operating system interfaces to computing arrangement components;

scanning the computing arrangement to determine configuration information about computing arrangement components reserved for use by the emulator operating system using the host operating system interfaces;

communicating the scanned configuration information to the emulator operating system; and configuring the emulator operating system using the communicated configuration information.

2. The method of claim 1, further comprising generating a data structure responsive to the scanning, the data structure comprising the scanned configuration information.

3. The method of claim 2, further comprising modifying the data structure through a user interface prior to communicating.

4. The method of claim 2, further comprising approving the data structure through a user interface prior to communicating.

5. The method of claim 1, wherein the host operating system comprises a Windows operating system, the emulator operating system comprises a mainframe operating system, scanning occurs during a boot process of the host operating system, and communication of the at least a portion of the scanned configuration information occurs during a boot process of the emulator operating system.

6. A method of configuration management for a computing arrangement having a host operating system, comprising:

executing an emulator on the host operating system;

executing an emulator operating system on the emulator;

scanning the computing arrangement using host operating system interfaces;

identifying at least one computing arrangement component reserved for use by the emulator, and the configuration thereof, in response to the scanning;

compiling a data structure representative of the configuration in response to the identifying;

communicating the configuration to the emulator operating system; and configuring the emulator operating system using the communicated configuration information.

7. The method of claim 6, wherein communication of the configuration occurs during the emulator operating system's boot process.

8. The method of claim 7, further comprising building a file representative of the data structure.

9. The method of claim 8, wherein the file comprises a Partition Data Bank (PDB) file representative of at least some components and connections of the computing arrangement.

10. The method of claim 6, wherein the steps of executing, scanning, identifying and compiling are automatically performed.

11. The method of claim 6, further comprising modifying the data structure through a user interface.

12. The method of claim 11, wherein modifying the data structure through a user interface occurs prior to communicating the configuration to the emulator operating system.

13. The method of claim 6, further comprising approving the data structure through a user interface prior to communicating.

14. The method of claim 6, wherein the host operating system comprises a Windows operating system.

15. The method of claim 6, wherein scanning occurs dynamically during a boot process of the host operating system.

16. The method of claim 6, wherein the host system operating interfaces comprise software interfaces.

17. The method of claim 6, wherein the emulator emulates a mainframe instruction set.

18. The method of claim 17, wherein the emulator operating system comprises a Unisys OS 2200 operating system.

19. The method of claim 6, wherein the at least one computing arrangement component is selected from a group comprising Input/Output Processors, Small Computer Systems Interface (SCSI) channels, control units, and devices.

20. A computing arrangement having a host operating system, comprising:
means for executing an emulator on the host operating system;
means for executing an emulator operating system on the emulator;
means for scanning the computing arrangement using host operating system interfaces;
means for identifying at least one computing arrangement component reserved for use by the emulator, and the configuration thereof, in response to the scanning;
means for compiling a data structure representative of the configuration in response to the identifying;
means for communicating the configuration to the emulator operating system; and
means for managing the configuration of the emulator operating system using the communicated configuration.

21. A computing arrangement having a host operating system, comprising:
an emulator executing on the host operating system;
an emulator operating system executing on the emulator;
host operating system interfaces adapted to scan the computing arrangement;
software adapted to identify at least one computing arrangement component reserved for use by the emulator, and the configuration thereof, in response to the scanning;
an application adapted to compile a data structure representative of the configuration in response to the identifying; and
a file arranged to communicate the configuration to the emulator operating system which is configured using the communicated configuration.

22. A computing arrangement having a first operating system, comprising:
a central processor programmed and configured to emulate a second computing arrangement, the emulated second computing arrangement being operable on the first operating system, and having an emulator operating system;
at least one computing arrangement component communicatively coupled to the central processor, the at least one computing arrangement component being reserved for use by the emulator operating system and scanned through first operating system interfaces; and
a Partition Data Bank (PDB) builder module programmed and configured to ascertain configuration information of the emulated second computing arrangement responsive to the scanning, and to assemble and communicate the configuration information to the emulator operating system which is configured using the communicated configuration information.

23. The computing arrangement of claim 22, wherein the PDB builder module comprises a processor programmed and configured to identify the configuration of the at least one computing arrangement component, to compile a data structure comprising scanned configuration information representative of the emulated second computing arrangement, and package a portion of said configuration information in a file arrangement.

24. The computing arrangement of claim 22, further comprising a user interface communicatively coupled to the PDB builder module, the user interface configured and arranged to selectively modify the data structure.

25. The computing arrangement of claim 22, wherein the at least one computing arrangement component is selected from a group comprising an Input/Output Processor, a Small Computer Systems Interface (SCSI) channel, a control unit, a tape drive, and a disk drive.

26. The computing arrangement of claim 23, wherein the file arrangement is communicated to the emulator operating system during the emulator operating system's boot process.

27. The computing arrangement of claim 23, wherein the file arrangement is retrieved by the emulator operating system during the emulator operating system's boot process.

28. The computing arrangement of claim 22, wherein the first operating system comprises a Windows operating system and the emulated second computing arrangement comprises a mainframe instruction set.

* * * * *